United States Patent Office 3,063,985
Patented Nov. 13, 1962

3,063,985
CYCLOPENTANOPHENANTHRENE COMPOUNDS AND PROCESS
John A. Zderic, Mexico City, Mexico, assignor, by mesne assignments, to Syntex Corporation, a corporation of Panama
No Drawing. Filed Dec. 15, 1960, Ser. No. 75,946
14 Claims. (Cl. 260—239)

The present invention relates to novel cyclopentanophenanthrene compounds and to a process for the production thereof.

More particularly, the present invention relates to 11a-aza-C-homo-17α-hydroxy-$\Delta^4$-pregnene-3,20-dione, to 11a-aza-C-homo-17α-hydroxy-$\Delta^{1,4}$-pregnadiene-3,20-dione, to acylated and N-alkylated derivatives thereof as well as to quaternary ammonium salts thereof.

The novel compounds of the present invention which are hypotensive agents possessing progestational, anti-androgenic, anti-estrogenic, anti-ovulatory and anti-gonadotrophic activities are represented by the following formulas:

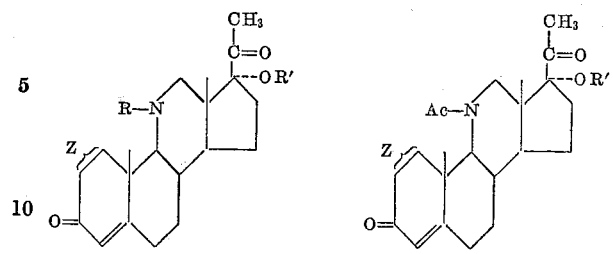

In the above formulas, R represents hydrogen, an alkyl or an aralkyl group containing up to 12 carbon atoms, R' represents hydrogen or a hydrocarbon carboxylic acyl group. Ac represents a hydrocarbon carboxylic acyl group and Z indicates a double bond or a saturated linkage between C–1 and C–2.

The acyl groups are derived from hydrocarbon carboxylic acids of less than twelve carbon atoms, saturated or unsaturated, of straight, branched, cyclic or cyclic-aliphatic chain, aromatic and may be substituted by functional groups such as hydroxy, alkoxy containing up to 5 carbon atoms, acyloxy containing up to 8 carbon atoms, amino, nitro or halogen.

The novel compounds of the present invention may be prepared by a process illustrated by the following equation:

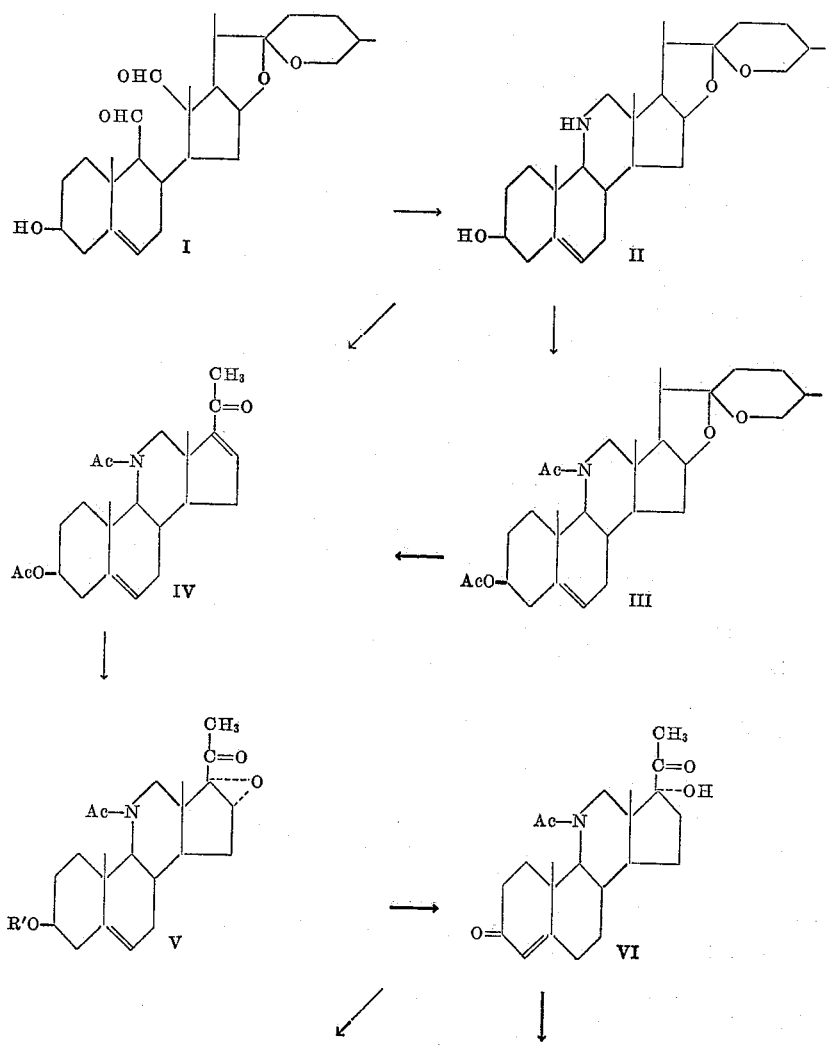

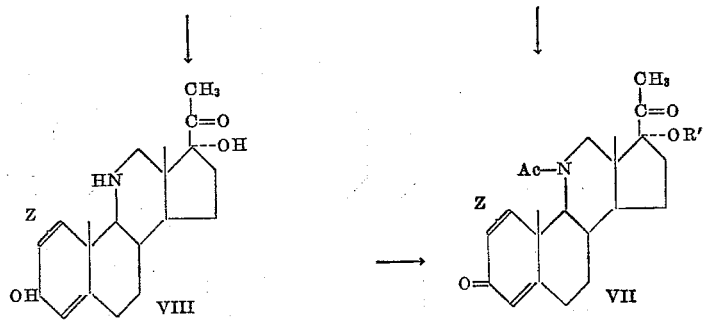

In the above formulas R', Ac and Z have the same meaning as previously set forth.

In practicing the process outlined above, the starting compound 11,12-seco-22a-Δ⁵-spirosten-3β-ol-11,12-dial (I) is prepared by treating Δ⁵-22a-spirosten-3β,12β-diol-11-one (disclosed by Rothman and Wall, J. Am. Chem. Soc. 79, 3228 (1957) with lithium aluminum hydride to form 11β,12β-dihydroxy diosgenin which upon reaction with lead tetraacetate in an inert solvent such as benzene is converted into the 11,12-seco-22a-Δ⁵-spirosten-3β-ol-11,12-dial (I). The dialdehyde is then reacted with ammonia in ethanol solution thereby yielding a Schiff base type intermediate which is then treated with lithium aluminum hydride in tetrahydrofuran to form 11a-aza-C-homo-22a-Δ⁵-spirosten-3β-ol (II). Degradation of the spiroketal side chain is then effected by conventional procedure as by reaction with acetic anhydride at about 200°, oxidation of the resulting pseudo-compound to the diosone and alkaline hydrolysis and acetylation of the latter thus forming 11a-N-acetyl-C-homo-Δ⁵,¹⁶-pregnadien-3β-ol-20-one acetate (IV). The degradation of the side chain may be preceded by acylation, preferably acetylation, thus forming 3β-acetoxy-11a-N-acetyl-C-homo-22a-Δ⁵-spirostene (III) which may then be subjected to degradation of the side chain to form the 11a-N-acetyl-C-homo-Δ⁵,¹⁶-pregnadien-3β-ol-20-one acylate (IV).

For introduction of the hydroxyl group at C-17α, the 16,17-double bond is first epoxidized, preferably by reaction with aqueous alkaline peroxide in which case the acyloxy group at C-3 is saponified, and there is formed 11a-N-acetyl-C-homo-16α,17α-epoxy-Δ⁵-pregnen-3β-ol-20-one (V: R'=hydrogen). Reacylation with a hydrocarbon carboxylic acid anhydride of less than 12 carbon atoms, preferably acetic anhydride, affords 11a-N-acetyl-C-homo-16α,17α-epoxy-Δ⁵-pregnen-3β-ol-20-one acylate (V: R'=acyl). The latter compound may also be prepared by epoxidizing the 16,17 double bond of 11a-N-acetyl-C-homo-Δ⁵,¹⁶-pregnadien-3β-ol-20-one acylate (IV) with t-butylhydroperoxide (see Yang, J. Am. Chem. Soc. 80, 5845 (1958)) which reaction does not affect the 3β-acyl group. The resulting 3β-acyloxy-11a-N-acetyl-C-homo-16α,17α-epoxy-Δ⁵-pregnen-3β-ol-20-one (V: R'=acyl) is reacted with hydrogen bromide to form the 16β-bromo-17α-hydroxy grouping which upon treatment with Raney nickel results in reductive debromination and there is formed the 17α-hydroxy compound, 11a-N-acetyl-C-homo-Δ⁵-pregnene-3β,17α-diol-20-one acylate. Upon subsequent acid treatment, the acylate group at C-3 is saponified to form the free 3β,17β-diol. By treatment with 8 N chromic acid, the 3β-hydroxy group is oxidized to the keto group and upon further treatment with acid the double bond at C-5,6 is shifted to C-4,5, to form 11a-N-acetyl-C-homo-Δ⁴-pregnen-17α-ol-3,20-dione (VI) which is then esterified with a hydrocarbon carboxylic acid anhydride of less than 12 carbon atoms in benzene solution and in the presence of p-toluenesulfonic acid to form the 17α-acylate (VII: R'=acyl; Z=saturated linkage). A double bond can be introduced prior to or subsequent to the esterification step by refluxing the 11a-N-acetyl-C-homo-Δ⁴-pregnen-17α-ol-3,- 20-dione or ester thereof with selenium dioxide in a solvent such as t-butanol and in the presence of catalytic amounts of pyridine to thus form 11a-N-acetyl-C-homo-Δ¹,⁴-pregnadien-17α-ol-3,20-dione or the esters thereof (VII: Z=double bond).

Upon reaction of 11a-N-acetyl-Δ⁴-pregnen-17α-ol-3,20-dione with methanolic potassium hydroxide, the acetyl group is removed and there is formed 11a-aza-C-homo-Δ⁴-pregnen-17α-ol-3,20-dione (VIII: Z=saturated linkage) which may be dehydrogenated at C-1,2 with selenium dioxide to form 11a-aza-C-homo-Δ¹,⁴-pregnadien-17α-ol-3,20-dione (VIII: Z=double bond). The latter compounds (VIII: Z=saturated linkage or Z=double bond) may be acylated at C-17α as described above with concurrent reacylation of the nitrogen moiety to form the corresponding esters (VII).

The novel 11a-N-alkylated-C-homo compounds of the present invention may be prepared by a process illustrated by the following equation:

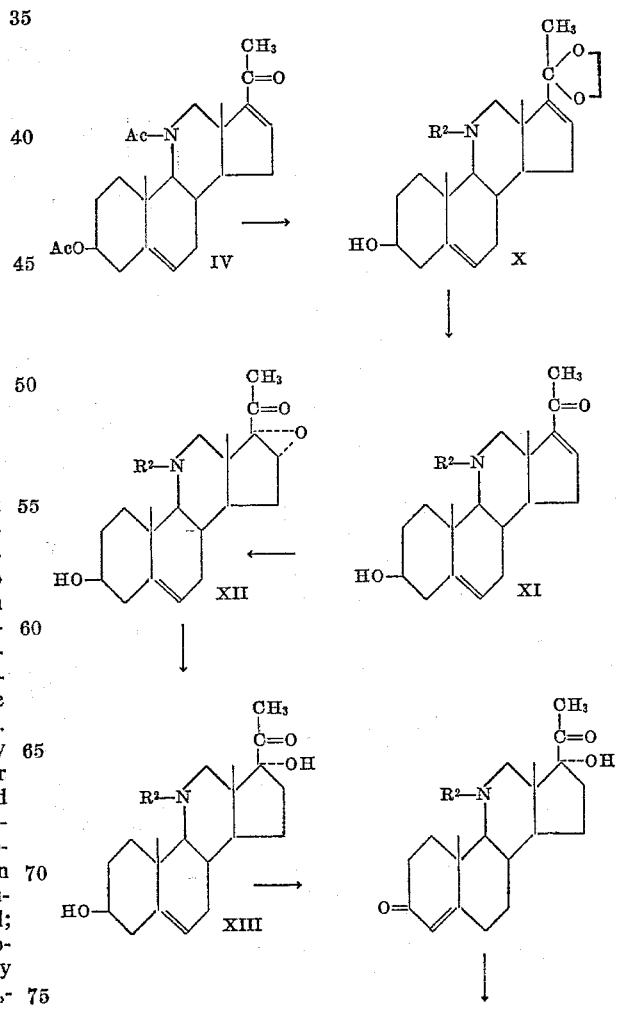

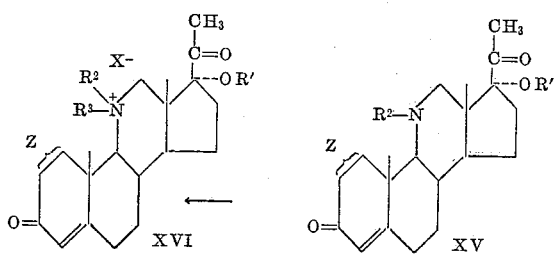

In the above formulas, Ac, R', and Z have the same meaning as previously set forth; $R^2$ represents an alkyl or aralkyl group of up to 12 carbon atoms; $R^3$ represents a lower alkyl group and X represents a halogen such as iodine, chlorine or bromine.

In practicing the process outlined above, 11a-N-acyl-C-homo-$\Delta^{5,16}$-pregnadien-3β-ol-20-one-3-acylate (IV), preferably 11a-N-acetyl-C-homo-$\Delta^{5,16}$-pregnadien-3β-ol-20-one-3-acylate, is reacted with ethyleneglycol in the presence of p-toluenesulfonic acid to form the cyclic ethylene ketal derivitive. The latter compound is then refluxed with lithium aluminum hydride in tetrahydrofuran to form the cyclic ethylene ketal of 11a-N-ethyl-C-homo-$\Delta^{5,16}$-pregnadien-3β-ol-20-one (X) which is then hydrolyzed with acid to form 11a-N-ethyl-C-homo-$\Delta^{5,16}$-pregnadien-3β-ol-20-one (XI). A hydroxyl group is then introduced at C–17α in the same manner as set forth above for the N-acylated compound by epoxidizing with aqueous alkaline peroxide, forming the 16β, 17α-bromohydrin and reductively debrominating to finally obtain 11a-N-ethyl-C-homo-$\Delta^5$-pregnen-3β,17α-diol-20-one (XIII). The 3β-hydroxy group is oxidized to the 3-keto group with 8 N chromic acid and the $\Delta^{5,6}$-bond is shifted to C-4,5 upon acid treatment thus producing 11a-N-ethyl-C-homo-$\Delta^4$-pregnen-17α-ol-3,20-dione (XIV).

The tertiary hydroxyl group may then be esterfied by reaction with hydrocarbon carboxylic acid anhydrides in benzene solution and in the presence of p-toluenesulfonic acid to form the 17α-acylates (XV: R'=acyl; Z=saturated linkage).

For introduction of a double bond at C-1,2 the 11a-N-ethyl-C-homo-$\Delta^4$-pregnen-17α-ol-3,20-dione or ester thereof is refluxed with selenium dioxide as heretofore described.

Quaternary ammonium salt derivatives of the foregoing compounds XV are prepared by conventional reaction with an alkyl or aralkyl halide in a solvent such as nitroalkane to form compounds XVI.

There are obtained other N-acylated and N-alkylated compounds by substituting for the N-acetyl group other acyl radicals of the type mentioned previously. Thus there are obtained N-acylated and N-alkylated compounds containing up to 12 carbon atoms such as N-propionyl, N-benzoyl, N-butyryl and the corresponding N-propyl, N-benzyl and N-butyl derivatives.

The following examples serve to illustrate but are not intended to limit the scope of the invention:

Example I

A solution of 10 g. of $\Delta^5$-22a-spirosten-3β,12β-diol-11-one diacetate (Rothman and Wall, J. Am. Chem. Soc. 79, 3228 (1957)) in 300 ml. of anhydrous tetrahydrofuran, was added dropwise to a suspension of 10 g. of lithium aluminum hydride in 1 liter of anhydrous tetrahydrofuran while stirring and the resulting mixture was refluxed for 30 minutes. Acetone was added cautiously to decompose the excess of hydride, then treated with aqueous sodium sulfate, finally with anhydrous sodium sulfate, the solid was filtered and the filtrate evaporated to dryness. The residue was triturated with hexane yielding 11β,12β-dihydroxy-diosgenin.

To a mixture of 8.1 g. of 11β,12β-dihydroxy-diosgenin, 140 ml. of glacial acetic acid and 210 ml. of thiophene-free benzene, 12.1 g. of lead tetraacetate were added and the mixture was stirred at room temperature for 5 minutes. 200 ml. of water containing 100 g. of sodium acetate and 4 g. of sodium iodide were added, the color was discharged by the addition of 80 ml. of saturated aqueous sodium thiosulfate solution and the product extracted twice, using each time 200 ml. of ethyl acetate. The pooled extracts were washed with aqueous sodium bicarbonate and water, dried over anhydrous sodium sulfate and evaporated to dryness. The residue was crystallized from a mixture of 60 ml. of methanol and 12.5 ml. of water to afford 11,12-seco-22a-$\Delta^5$-spirosten-3β-ol-11,12-dial.

A mixture of 5 g. of the dialdehyde and 250 ml. of ammonia-saturated ethanol was refluxed during 10 hours. Upon evaporation of the solvent, a crystalline residue was obtained which was refluxed with 2.5 g. of lithium aluminum hydride, in mixture with 250 ml. of tetrahydrofuran during 20 hours. The excess of hydride was then decomposed by careful addition of acetone, then a small amount of saturated aqueous sodium sulfate solution and finally solid anhydrous sodium sulfate were added. The solid was collected by filtration and the filtrate evaporated to dryness under reduced pressure. Crystallization from aqueous ethanol yielded 11a-aza-C-homo-22a-$\Delta^5$-spirosten-3β-ol.

Example II 4 g. of the latter compound was heated with 20 ml. of acetic anhydride in a sealed tube at 200° C. for 55 minutes; it was then cooled, the excess of anhydride was hydrolyzed by the addition of 8 ml. of water and the mixture was treated with 2 g. of chromium trioxide in 25 ml. of 80% acetic acid; after stirring for three hours at room temperature, the mixture was diluted with water, extracted with ether and the extract was washed with water, dried over anhydrous sodium sulfate and the ether was evaporated. The residue was mixed with 200 ml. of 60% acetone containing 2 g. of potassium hydroxide and refluxed for 5 hours, then concentrated to a small volume, cooled, diluted with water and extracted with ether. The extract was washed several times with water, dried over anhydrous sodium sulfate and evaporated to dryness. Upon conventional acetylation, followed by recrystallization from acetone-hexane, there was produced 3β-acetoxy-11a-N-acetyl-C-homo-$\Delta^{5,16}$-pregnadien-20-one.

Example III 2 g. of 11a-aza-C-homo-22a-$\Delta^5$-spirosten-3β-ol (described in Example I) was treated with 2 ml. of acetic anhydride in 10 ml. of pyridine at room temperature. The mixture was allowed to stand overnight and was then diluted with water, the solid was collected by filtration, washed with water, dried and recrystallized from acetone-hexane thus affording 3β-acetoxy-11a-N-acetyl-C-homo-22a-$\Delta^5$-spirosten. The latter compound was then treated with acetic anhydride at 200°, the resulting pseudo-sapogenin oxidized to the diosone and was then treated with potassium hydroxide and reesterified as described in Example II to thus yield 3β-acetoxy-11a-N-acetyl-C-homo-$\Delta^{5,16}$-pregnadien-20-one, identical with the compound obtained in Example II.

Example IV 2 g. of 3β-acetoxy-11a-N-acetyl-C-homo-$\Delta^{5,16}$-pregnadien-20-one in 12 ml. of benzene, 1.0 ml. of Triton B (benzyltrimethylammonium hydroxide, Midwest Laboratories Inc.) and 1.2 ml. of t-butylhydroperoxide (Lucidol Division, Wallace and Tiernan, Inc.) were reacted at room temperature overnight. The mixture was then diluted with water, saturated with sodium chloride and extracted repeatedly with ether. The combined extracts were dried over anhydrous sodium sulfate and evaporated to dryness. By crystallization from acetone-hexane, 3β- acetoxy-11a-N-acetyl-16α,17α-oxido-C-homo-Δ⁵-pregnen-20-one was obtained.

*Example V*

1.4 g. of the above compound in 16 ml. of glacial acetic acid were treated with 3 ml. of acetic acid saturated with dry hydrogen bromide, stirring at room temperature for 1.5 hours. The mixture was then diluted with ice water and the bromohydrin which precipitated was collected by filtration, washed with water and refluxed with 10 g. of Raney nickel in 500 ml. of methanol for 30 minutes. The nickel was removed by filtration, the filtrate was evaporated to dryness and the residue crystallized from acetone-hexane thus furnishing 3β-acetoxy-11a-N-acetyl-C-homo-Δ⁵-pregnen-17α-ol-20-one.

The 3-acetoxy group of the above compound was hydrolyzed by treating a solution of 1 g. of the compound with 25 ml. of a 2.5% solution of perchloric acid in methanol at room temperature during 18 hours. Subsequent dilution with water and collection of the precipitate by filtration, finally water-washing, drying and recrystallization from acetone yielded free 11a-N-acetyl-C-homo-Δ⁵-pregnene-3β,17α-diol-20-one.

*Example VI*

To a solution of 2 g. of the above compound in 100 ml. of acetone, cooled in an ice bath was added a solution of 8 N chromic acid in dilute sulfuric acid in a slow stream, with stirring and under nitrogen until the color of chromium trioxide persisted in the mixture. The product was precipitated by addition of water, collected by filtration, water-washed, dried and crystallized from acetone-hexane to afford 11a-N-acetyl-C-homo-Δ⁵-pregnen-17α-ol-3,20-dione.

1 g. of the foregoing compound was treated in 10 ml. of acetone with a current of dry hydrogen chloride for 1 hour at 20° C., the mixture was then poured into ice-water, the solid collected by filtration, washed with water, dried and crystallized from acetone-hexane. Thus 11a-N-acetyl-C-homo-Δ⁴-pregnen-17α-ol-3,20-dione was obtained.

500 mg. of the above compound was allowed to react for 1 hour at room temperature with 25 cc. of acetic anhydride and 500 mg. of p-toluenesulfonic acid in 25 cc. of acetic acid. The mixture was then poured into ice water and the solid formed was collected, washed with water, dried and crystallized from acetone-hexane, thus producing 11a-N-acetyl-C-homo-Δ⁴-pregnen-17α-ol-3,20-dione acetate.

*Example VII*

A solution of 0.4 g. of 3β-acetoxy-11a-N-acetyl-C-homo-Δ⁵,¹⁶-pregnadien-20-one in 16 cc. of methanol was treated at 0° C. with 1 cc. of 35% hydrogen peroxide and 0.4 g. of potassium hydroxide previously dissolved in 1.6 cc. of water and the mixture kept at 0° C. for 70 hours, diluted with ice-salt water and extracted several times with ether. The combined extracts were washed with water to neutral, dried over anhydrous sodium sulfate and evaporated to dryness. Crystallization from acetone-hexane gave 11a-N-acetyl-16α,17α-oxido-C-homo-Δ⁵-pregnen-3β-ol-20-one.

The above compound was treated with 2 cc. of pyridine and 2 cc. of acetic anhydride and the mixture was heated on the steam bath for 1 hour. After the usual work-up, there was obtained 11a-N-acetyl-16α,17α-oxido-C-homo-Δ⁵-pregnen-3β-ol-20-one acetate, identical with that obtained in Example IV.

*Example VIII*

A stirred mixture of 1 g. of 11a-N-acetyl-homo-Δ⁴-pregnen-17α-ol-3,20-dione, 50 cc. of t-butanol, 400 mg. of selenium dioxide and 0.3 cc. of pyridine was refluxed for 48 hours under an atmosphere of nitrogen, filtered through celite, and the filtrate was evaporated to dryness under reduced pressure. The residue was dissolved in acetone, treated with decolorizing charcoal, refluxed for 1 hour, filtered and the filtrate was evaporated. The residue was purified by chromatography on neutral alumina and the solid eluates were crystallized from acetone-hexane, thus giving 11a-N-acetyl-C-homo-Δ¹,⁴-pregnadien-17α-ol-3,20-dione.

A solution of 500 mg. of the latter compound in 30 cc. of benzene was treated with 1 cc. of propionic anhydride and 1 g. of p-toluenesulfonic acid and the mixture was kept at room temperature for 48 hours, the solution was then washed to neutral, dried over anhydrous sodium sulfate and evaporated to dryness. Recrystallization of the residue from acetone-ether gave 11a-N-acetyl-C-homo-Δ¹,⁴-pregnadien-17α-ol-3,20-dione propionate.

*Example IX*

A mixture of 2 g. of 3β-acetoxy-11a-N-acetyl-C-homo-Δ⁵,¹⁶-pregnadien-20-one, 20 cc. of dry benzene, 16 cc. of ethylene glycol and 300 mg. of p-toluenesulfonic acid monohydrate was refluxed for 8 hours, using a Dean-Stark water separator. The cooled reaction solution was washed with 5% aqueous sodium bicarbonate solution and water to neutral, dried over anhydrous sodium sulfate and the solvent was evaporated. Crystallization of the residue from acetone-ether afforded 20-ethylenedioxy-11a-N-acetyl-C-homo-Δ⁵,¹⁶-pregnadien-3β-ol-acetate.

A solution of 1 g. of the above 20-ketal in 30 cc. of anhydrous tetrahydrofuran was added dropwise to a suspension of 5 g. of lithium aluminum hydride in 300 cc. of anhydrous tetrahydrofuran and the mixture refluxed for 30 hours with stirring. Acetone was added cautiously to decompose the excess of hydride, then saturated aqueous sodium sulfate solution and finally solid anhydrous sodium sulfate were added. The solid was filtered and washed well with hot ethyl acetate, and the filtrate and washings were evaporated to dryness under reduced pressure. Crystallization of the residue from acetone-hexane gave 20-ethylene ketal of 11a-N-ethyl-C-homo-Δ⁵,¹⁶-pregnadien-3β-ol-20-one.

A mixture of 600 mg. of the above compound in 20 cc. of 70% aqueous acetic acid was heated on the steam bath for 30 minutes; the resulting solution was then poured into dilute sodium hydroxide solution and the formed precipitate collected by filtration, washed with water and air dried. There was thus obtained 11a-N-ethyl-C-homo-Δ⁵,¹⁶-pregnadien-3β-ol-20-one.

*Example X*

A solution of 2 g. of 11a-N-ethyl-C-homo-Δ⁵,¹⁶-pregnadien-3β-ol-20-one, 100 cc. of methanol was cooled to 15° C. and 5 cc. of 35% hydrogen peroxide was added. A solution of 2 g. of sodium hydroxide in 8 cc. of water was then added with stirring and cooling, at such a rate that the internal temperature did not exceed 25° C. After being allowed to stand at this temperature for 17 hours, the mixture was poured into ice-cold water, and then acidified with dilute hydrochloric acid. The formed precipitate was collected, washed with water and dried, thus giving 11a-N-ethyl-16α,17α-oxido-C-homo-Δ⁵-pregnen-3β-ol-20-one.

The above compound was acetylated in a conventional manner and the resulting 3-acetate was subjected to the procedures of Examples V and VI, thus producing successively 11a-N-ethyl-C-homo-Δ⁵-pregnene-3β,17α-diol-20-one 3-acetate, 11a-N-ethyl-C-homo-Δ⁵-pregnene-3β,17α-diol-20-one and 11a-N-ethyl-C-homo-Δ⁴-pregnen-17α-ol-3,20-dione.

Treatment of the latter compound with selenium dioxide in t-butanol solution, in accordance with the method of Example VIII gave 11a-N-ethyl-C-homo-Δ¹,⁴-pregnadien-17α-ol-3,20-dione.

*Example XI*

A solution of 1 g. of 11a-N-ethyl-C-homo-Δ⁴-pregnen-17α-ol-3,20-dione in 50 cc. of benzene was treated with 2 cc. of acetic anhydride and 1 g. of p-toluenesulfonic acid; the mixture was kept at room temperature for 48 hours, washed well with sodium carbonate solution and water to neutral, dried over anhydrous sodium sulfate and evaporated to dryness; by chromatography of the residue on neutral alumina and recrystallization of the solid eluates from acetone-hexane, there was obtained 11a-N-ethyl-C-homo-Δ⁴-pregnen-17α-ol-3,20-dione acetate.

*Example XII*

A solution of 300 mg. of 11a-N-ethyl-C-homo-Δ⁴-pregnen-17α-ol-3,20-dione acetate in 30 cc. of nitromethane was treated with 3 g. of methyl iodide and heated in a sealed tube at 100° C. for 3 hours, concentrated almost to dryness, diluted with a little cold ether and the precipitate was collected by filtration, thus giving the methoiodide of 11a-N-ethyl-C-homo-Δ⁴-pregnen-17α-ol-3,20-dione acetate.

In a similar manner, 11a-N-ethyl-C-homo-Δ¹,⁴-pregnadien-17α-ol-3,20-dione was converted into the methoiodide of 11a-N-ethyl-C-homo-Δ¹,⁴-pregnadien-17α-ol-3,20-dione.

*Example XIII*

1 g. of 11a-N-acetyl-C-homo-Δ⁴-pregnen-17α-ol-3,20-dione, obtained as described in Example VI was refluxed for 48 hours under an atmosphere of nitrogen with 50 cc. of 4% methanolic potassium hydroxide solution and then neutralized with acetic acid. Part of the solvent was removed under reduced pressure, water added and then extracted with methylene chloride, the organic extract washed to neutral, dried over anhydrous sodium sulfate and evaporated to dryness. Chromatography of the residue gave the pure 11a-aza-C-homo-Δ⁴-pregnen-17α-ol-3,20-dione.

By the same method, but using 11a-N-acetyl-C-homo-Δ¹,⁴-pregnadien-17α-ol-3,20-dione (cf. Example VIII) as starting material, there was obtained 11a-aza-C-homo-Δ¹,⁴-pregnadien-17α-ol-3,20-dione.

*Example XIV*

By following the esterification method of Example XI, the compounds obtained in the preceding example were converted into the corresponding 11,17-diesters, namely 11a - N - acetyl - 17α - acetoxy-C-homo-Δ⁴-pregnene-3,20-dione and 11a-N-acetyl-17α-acetoxy-C-homo-Δ¹,⁴-pregnadiene-3,20-dione.

*Example XV*

By following the method of Example XI, but using cyclopentylpropionic anhydride instead of acetic anhydride 11a-N-ethyl-C-homo-Δ⁴-pregnen-17α-ol-3,20-dione, 11a - N - acetyl-C-homo-Δ¹,⁴-pregnadien-17α-ol-3,20-dione were converted into the corresponding cyclopentylpropionates.

*Example XVI*

By following the method of Example XI, but using propionic anhydride as esterifying agent, 500 mg. of 11a-aza-C-homo-Δ⁴-pregnen-17α-ol-3,20-dione were converted into 11a-N-propionyl - 17α - propionoxy-C-homo-Δ⁴-pregnen-3,20-dione.

I claim:

1. A compound of the following formula:

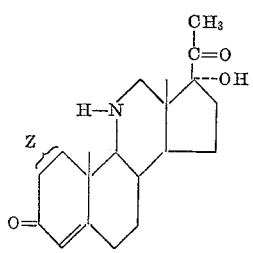

wherein Z is selected from the group consisting of a double bond between C–1 and C–2 and a saturated linkage between C–1 and C–2.

2. 11a-aza-C-homo-Δ⁴-pregnen-17α-ol-3,20-dione.
3. 11a-aza-C-homo-Δ¹,⁴-pregnadien-17α-ol-3,20-dione.
4. A compound of the following formula:

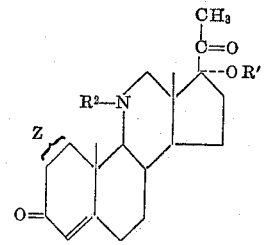

wherein R′ is selected from the group consisting of hydrogen and a hydrocarbon carboxylic acyl group of less than 12 carbon atoms; Z is selected from the group consisting of a double bond between C–1 and C–2 and a saturated linkage between C–1 and C–2; and R² is selected from the group consisting of alkyl and aralkyl containing up to 12 carbon atoms.

5. 11a-N-ethyl-C-homo-Δ⁴-pregnen-17α-ol-3,20-dione.
6. 11a - N - ethyl-C-homo-Δ¹,⁴-pregnadien-17α-ol-3,20-dione acetate.
7. The lower alkyl quaternary ammonium salts of a compound of the following formula:

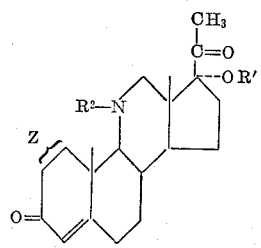

wherein R′ is selected from the group consisting of hydrogen and a hydrocarbon carboxylic acyl group of less than 12 carbon atoms; R² is selected from the group consisting of alkyl and aralkyl containing up to 12 carbon atoms; and Z is selected from the group consisting of a double bond between C–1 and C–2 and a saturated linkage between C–1 and C–2.

8. The methoiodide of 11a-N-ethyl-C-homo-Δ⁴-pregnen-17α-ol-3,20-dione acetate.
9. The methoiodide of 11a-N-ethyl-C-homo-Δ¹,⁴-pregnadien-17α-ol-3,20-dione.
10. A compound of the following formula:

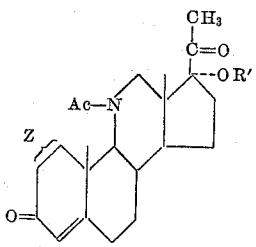

wherein R′ is selected from the group consisting of hydrogen and a hydrocarbon carboxylic acyl group of less than 12 carbon atoms; Z is selected from the group consisting of a double bond between C–1 and C–2 and a saturated linkage between C–1 and C–2; and Ac represents a hydrocarbon carboxylic acyl group of less than 12 carbon atoms.

11. 11a-N-acetyl-C-homo-$\Delta^4$-pregnen-17α-ol-3,20-dione acetate.

12. 11a - N - acetyl - C - homo - $\Delta^{1,4}$ - pregnadien - 17α-ol-3,20-dione propionate.

13. A compound of the following formula:

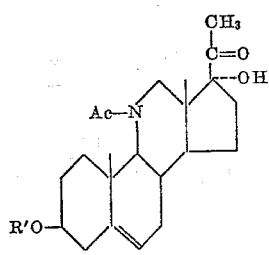

wherein R′ is selected from the group consisting of hydrogen and a hydrocarbon carboxylic acyl group of less than 12 carbon atoms; and Ac represents a hydrocarbon carboxylic acyl group of less than 12 carbon atoms.

14. A compound of the following formula:

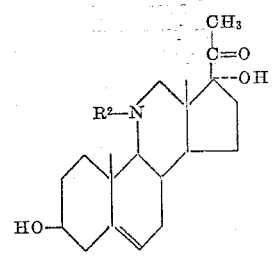

wherein $R^2$ is selected from the group consisting of alkyl and aralkyl containing up to 12 carbon atoms.

References Cited in the file of this patent
UNITED STATES PATENTS

| | | |
|---|---|---|
| 2,806,028 | Mazur | Sept. 10, 1957 |
| 2,806,029 | Mazur | Sept. 10, 1957 |